US009593171B2

(12) United States Patent
Guidotti et al.

(10) Patent No.: US 9,593,171 B2
(45) Date of Patent: Mar. 14, 2017

(54) CATALYST COMPONENTS FOR THE POLYMERIZATION OF OLEFINS

(75) Inventors: Simona Guidotti, Ferrara (IT); Giampiero Morini, Ferrara (IT); Simona Esposito, Ferrara (IT); Alessandro Mignogna, Ferrara (IT); Joachim T. M. Pater, Ferrara (IT); Fabrizio Piemontesi, Ferrara (IT); Diego Brita, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 268 days.

(21) Appl. No.: 14/111,144

(22) PCT Filed: Mar. 29, 2012

(86) PCT No.: PCT/EP2012/055593

§ 371 (c)(1),
(2), (4) Date: Oct. 10, 2013

(87) PCT Pub. No.: WO2012/139897

PCT Pub. Date: Oct. 18, 2012

(65) Prior Publication Data

US 2014/0046010 A1 Feb. 13, 2014

Related U.S. Application Data

(60) Provisional application No. 61/475,399, filed on Apr. 14, 2011.

(30) Foreign Application Priority Data

Apr. 12, 2011 (EP) .................................... 11162016

(51) Int. Cl.
*C08F 4/16* (2006.01)
*C08F 10/06* (2006.01)

(52) U.S. Cl.
CPC ................ *C08F 4/16* (2013.01); *C08F 10/06* (2013.01)

(58) Field of Classification Search
None
See application file for complete search history.

(56) References Cited

U.S. PATENT DOCUMENTS

2010/0069580 A1 3/2010 Standaert et al.
2011/0040051 A1 2/2011 Xie et al.
2012/0220726 A1* 8/2012 Cavalieri ............. C08F 210/06 525/240
2013/0102744 A1* 4/2013 Fushimi ................. C08F 10/06 526/123.1

FOREIGN PATENT DOCUMENTS

WO WO00/63261 A1 10/2000

OTHER PUBLICATIONS

PCT International Search Report & Written Opinion mailed Sep. 10, 2012, for PCT/EP2012/055593.

* cited by examiner

*Primary Examiner* — Catherine S Branch

(57) ABSTRACT

A porous solid catalyst component comprising a magnesium halide, a titanium compound having at least a Ti-halogen bond and at least two electron donor compounds one of which being selected from 1,3-diethers and the other being selected from succinates, characterized by the fact that the molar ratio ID/Ti is from 0.30 to 0.90, where ID is the total molar amount of succinate and 1,3-diether, the molar ratio of the 1,3-diether donor to the succinate donor is higher than, or equal to, 0.60.

4 Claims, No Drawings

CATALYST COMPONENTS FOR THE POLYMERIZATION OF OLEFINS

This application is the U.S. National Phase of PCT International Application PCT/EP2012/055593, filed Mar. 29, 2012, claiming priority of European Patent Application No. 11162016.7, filed Apr. 12, 2011, and the benefit under 35 U.S.C. 119(e) of U.S. Provisional Application No. 61/475,399 filed Apr. 14, 2011, the contents of which are incorporated herein by reference in their entirety.

FIELD OF THE INVENTION

The present invention relates to catalyst components for the polymerization of olefins, in particular propylene, comprising a Mg dihalide, a Ti compound having at least one Ti-halogen bond and at least two electron donor compounds selected from specific classes.

The modern ZN catalysts including titanium compounds supported on magnesium halides are well known in the art. Catalysts of this type are described in U.S. Pat. No. 4,298,718. Said catalysts comprise titanium tetrahalides supported on halides of magnesium. Although the catalysts have high activity in the polymerization of alpha olefins like propylene, they are not very stereospecific. Improvements to stereospecificity have been obtained by adding electron-donor compounds to the solid catalyst components.

BACKGROUND OF THE INVENTION

High performance level in terms of catalyst activity and stereospecificity has been obtained with the catalysts described in the European patent No. 045977. Said catalysts have, as a solid catalysts component, a magnesium halide on which is supported a titanium halide, preferably $TiCl_4$, and an electron-donor compound, selected from specific classes of carboxylic acid esters, and, as co-catalyst component, a system formed of an Al-trialkyl compound and a silicon compound containing at least one Si—OR bond where R is a hydrocarbyl radical.

Most of the polypropylene catalysts used nowadays are based on phthalate diesters as internal donors used in combination with an aluminium alkyl cocatalyst and with alkylalkoxysilanes as selectivity control agents (external donors). A particular type of these catalysts, those endowed with a relatively high porosity are also used in the preparation of high impact heterophasic copolymers comprising a crystalline propylene homo or copolymer matrix and a substantial amount, in certain applications more than 50% wt, of a very low crystalline, highly soluble in xylene ethylene based copolymer.

For this last specific application the catalyst has to show also a good morphological stability allowing to produce a substantial amount of low crystallinity copolymer without showing phenomena of clogging, formation of chunks and particle agglomeration or adhesion to reactor walls.

The high porosity phthalate-based catalysts are generally endowed with this feature as shown by EP-A-395083 disclosing obtained by contacting a titanium compound, an electron donor compound (phthalate), with a $MgCl_2.(EtOH)_m$ in which m is from 0.15 to 1.7 that has been in turn obtained by partial dealcoholation of adducts with a higher alcohol content.

However, the fact that sometimes the high impact compositions produced with this catalyst show a too high content of oligomers that negatively affect their properties and the toxicity problems that might be associated with the use of phthalates leads to evaluate alternatives for their replacement.

The European patent No. 0361494, EP728769 and the international patent application WO99/57160 describe very active solid catalyst components for the polymerization of olefins comprising, as an internal electron-donor compound, a 1,3-diether characterized by a specific structure and/or by specific reactivity characteristics toward the anhydrous magnesium chloride and $TiCl_4$. In WO99/57160 an additional donor selected from esters of carboxylic acids and in particular malonates, can be present.

The catalysts obtained from the reaction of said catalyst components with an Al-alkyl compound exhibits a so high activity and stereospecificity in the polymerization of olefins, that the use of an external electron-donor can be avoided. It has to be noted that in the above mentioned documents the 1,3-diether based catalysts are always prepared starting from a support which does not generate a high porosity catalyst. When trying to apply the approach described in EP 395083, using 1,3-diether as internal donor, it has been observed that the rate of incorporation of the diether in the catalyst is much lower and the catalysts obtained show performances worsened to an unacceptable level in terms of activity/stereospecificity balance. It would be therefore important to find a way of generating a catalyst free from phthalates having a good morphological stability and high activities even when a 1,3-diether is used as internal donor.

SUMMARY OF THE INVENTION

The applicant has now found that a solid catalyst component having a specific porosity and a specific chemical composition is able to generate high impact grade polymer compositions also without the use of phthalate based donors.

DETAILED DESCRIPTION OF THE INVENTION

The present invention therefore relates to a solid catalyst component comprising a magnesium halide, a titanium compound having at least a Ti-halogen bond and at least two electron donor compounds one of which being selected from 1,3 diethers and the other being selected from succinates, said catalyst component being characterized by the fact that the molar ratio ID/Ti is from 0.30 to 0.90, where ID is the total molar amount of succinate and 1,3-diether, the molar ratio between the 1,3 diether donor and the succinate donor is higher than, or equal to, 0.60 and the porosity determined by mercury method of the solid catalyst component due to pore with radius equal to or less than 1 μm is at least 0.30 $cm^3/g$.

Preferably, the ID/Ti ratio is from 0.45 to 0.75 and more preferably from 0.50 to 0.80. Preferably, the molar ratio of the 1,3-diether donor and the succinate donor ranges from 0.80 to 2 and more preferably from 1 to 1.80.

The porosity is preferably higher than 0.35 more preferably higher than 0.40 and especially higher than 0.42 $cm^3/g$.

The preferred succinates are those belonging to of formula (I):

(I)

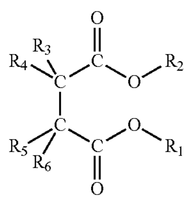

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom of the succinate chain can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (II) is that in which $R_3$ to $R_5$ are hydrogen and $R_6$ is a branched alkyl, cycloalkyl, aryl, arylalkyl and alkylaryl radical having from 3 to 10 carbon atoms. Specific examples of suitable monosubstituted succinate compounds are diethyl sec-butylsuccinate, diethyl thexylsuccinate, diethyl cyclopropylsuccinate, diethyl norbornylsuccinate, diethyl trimethylsilylsuccinate, diethyl methoxysuccinate, diethyl p-methoxyphenylsuccinate, diethyl p-chlorophenylsuccinate diethyl phenylsuccinate, diethyl cyclohexylsuccinate, diethyl benzylsuccinate, diethyl cyclohexylmethylsuccinate, diethyl t-butylsuccinate, diethyl isobutylsuccinate, diethyl isopropylsuccinate, diethyl neopentylsuccinate, diethyl isopentylsuccinate, diethyl(1-trifluoromethylethyl) succinate, diethyl fluorenylsuccinate, diisobutyl sec-butylsuccinate, diisobutyl thexylsuccinate, diisobutyl cyclopropylsuccinate, diisobutyl norbornylsuccinate, diisobutyl perihydrosuccinate, diisobutyl trimethylsilylsuccinate, diisobutyl methoxysuccinate, Diisobutyl p-methoxyphenylsuccinate, diisobutyl p-chlorophenylsuccinate, diisobutyl cyclohexylsuccinate, diisobutyl benzylsuccinate, diisobutyl cyclohexylmethylsuccinate, diisobutyl t-butylsuccinate, diisobutyl isobutylsuccinate, diisobutyl isopropylsuccinate, diisobutyl neopentylsuccinate, diisobutyl isopentylsuccinate, diisobutyl(1-trifluoromethylethyl)succinate, diisobutyl phenylsuccinate, diisobutyl fluorenylsuccinate, dineopentyl sec-butylsuccinate, dineopentyl thexylsuccinate, dineopentyl cyclopropylsuccinate, dineopentyl norbornylsuccinate, dineopentyl trimethylsilylsuccinate, dineopentyl methoxysuccinate, dineopentyl p-methoxyphenylsuccinate, dineopentyl p-chlorophenylsuccinate dineopentyl phenylsuccinate, dineopentyl cyclohexylsuccinate, dineopentyl benzylsuccinate, dineopentyl cyclohexylmethylsuccinate, dineopenthyl t-butylsuccinate, dineopentyl isobutylsuccinate, dineopentyl isopropylsuccinate, dineopentyl neopentylsuccinate, dineopentyl isopentylsuccinate, dineopentyl(1-trifluoromethylethyl)succinate, dineopentyl fluorenylsuccinate. Another preferred group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom.

Furthermore, also the compounds in which at least two radicals different from hydrogen are linked to different carbon atoms of the succinate chain, that is $R_3$ and $R_5$ or $R_4$ and $R_6$ are particularly preferred. Specific examples of suitable disubstituted succinates are: diethyl 2,2-dimethylsuccinate, diethyl 2-ethyl-2-methylsuccinate, diethyl 2-benzyl-2-isopropylsuccinate, diethyl 2-cyclohexylmethyl-2-isobutylsuccinate, diethyl 2-cyclopentyl-2-n-butyl succinate, diethyl 2,2-diisobutylsuccinate, diethyl 2-cyclohexyl-2-ethylsuccinate, diethyl 2-isopropyl-2-methylsuccinate, diethyl 2-tetradecyl-2-ethyl succinate, diethyl 2-isobutyl-2-ethylsuccinate, diethyl 2-(1-trifluoromethyl-ethyl)-2-methylsuccinate, diethyl 2-isopentyl-2-isobutylsuccinate, diethyl 2-phenyl 2-n-butylsuccinate, diisobutyl 2,2-dimethylsuccinate, diisobutyl 2-ethyl-2-methylsuccinate, diisobutyl 2-benzyl-2 isopropylsuccinate, diisobutyl 2-cyclohexylmethyl-2-isobutylsuccinate, diisobutyl 2-cyclopentyl-2-n-butylsuccinate, diisobutyl 2,2-diisobutylsuccinate, diisobutyl 2-cyclohexyl-2-ethylsuccinate, diisobutyl 2-isopropyl-2-methylsuccinate, diisobutyl 2-tetradecyl-2-ethylsuccinate, diisobutyl 2-isobutyl-2-ethylsuccinate, diisobutyl 2-(1-trifluoromethyl-ethyl)-2-methylsuccinate, diisobutyl 2-isopentyl-2-isobutylsuccinate, diisobutyl 2-phenyl 2-n-butyl-succinate, dineopentyl 2,2-dimethylsuccinate, dineopentyl 2-ethyl-2-methylsuccinate, dineopentyl 2-Benzyl-2-isopropylsuccinate, dineopentyl 2-cyhexylmethyl-2-isobutylsuccinate, dineopentyl 2-cyclopentyl-2-n-butylsuccinate, dineopentyl 2,2-diisobutylsuccinate, dineopentyl 2-cyclohexyl-2-ethylsuccinate, dineopentyl 2-isopropyl-2-methylsuccinate, dineopentyl 2-tetradecyl-2-ethylsuccinate, dineopentyl 2-isobutyl-2-ethylsuccinate, dineopentyl 2-(1-trifluoromethyl-ethyl)-2-methylsuccinate, dineopentyl 2-isopentyl-2-isobutylsuccinate, dineopentyl 2-phenyl 2-n-butylsuccinate.

Furthermore, also the compounds in which at least two radicals different from hydrogen are linked to different carbon atoms, that is $R_3$ and $R_5$ or $R_4$ and $R_6$ are particularly preferred. Specific examples of suitable compounds are diethyl 2,3bis(trimethylsilyl)succinate, diethyl 2,2-secbutyl-3-methylsuccinate, diethyl 2-(3,3,3,trifluoropropyl)-3-methylsuccinate, diethyl 2,3 bis(2-ethyl-butyl)succinate, diethyl 2,3-diethyl-2-isopropylsuccinate, diethyl 2,3-diisopropyl-2-methylsuccinate, diethyl 2,3-dicyclohexyl-2-methyl diethyl 2,3-dibenzylsuccinate, diethyl 2,3-diisopropylsuccinate, diethyl 2,3-bis(cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2,3-tetradecylsuccinate, diethyl 2,3-fluorenylsuccinate, diethyl 2-isopropyl-3-isobutylsuccinate, diethyl 2-terbutyl-3-isopropylsuccinate, diethyl 2-ipropyl-3-cyclohexylsuccinate, diethyl 2-isopentyl-3-cyclohexylsuccinate, diethyl 2-tetradecyl-3-cyclohexylmethylsuccinate, diethyl 2-cyclohexyl-3-cyclopentylsuccinate. diisobutyl 2,3-diethyll-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-(1-trifluoromethyl-ethyl) succinate, diisobutyl 2,3-tetradecylsuccinate, diisobutyl 2,3- fluorenylsuccinate, diisobutyl 2-ipropyl-3-ibutylsuccinate, diisobutyl 2-terbutyl-3-ipropylsuccinate, diisobutyl 2-ipropyl-3-cyclohexylsuccinate, diisobutyl 2-isopentyl-3-cyclohexylsuccinate, diisobutyl 2-tetradecyl-3-cyclohexylmethylsuccinate, diisobutyl 2-cyclohexyl-3-cyclopentylsuccinate, dineopentyl 2,3bis(trimethylsilyl) succinate, dineopentyl 2,2-secbutyl-3-methylsuccinate, dineopentyl 2-(3,3,3,trifluoropropyl)-3-methylsuccinate, dineopentyl 2,3 bis(2-ethyl-butyl)succinate, dineopentyl 2,3-diethyl-2-isopropylsuccinate, dineopentyl 2,3-diisopropyl-2-methylsuccinate, dineopentyl 2,3-dicyclohexyl-2-methyl, dineopentyl 2,3-dibenzylsuccinate, dineopentyl 2,3-diisopropylsuccinate, dineopentyl 2,3-bis (cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-di-isopentylsuccinate, dineopentyl 2,3-(1-trifluoromethyl-ethyl)succinate, dineopentyl 2,3-tetradecylsuccinate, dineopentyl 2,3-fluorenylsuccinate, dineopentyl 2-ipropyl-3-ibutylsuccinate, dineopentyl 2-terbutyl-3-isopropylsuccinate, dineopentyl 2-isopropyl-3-cyclohexylsuccinate, dineopentyl 2-isopentyl-3-cyclohexylsuccinate, dineopentyl 2-tetradecyl-3-cyclohexylmethyl succinate, dineopentyl 2-cyclohexyl-3-cyclopentylsuccinate.

A preferred subclass of succinates can be selected from those of formula (II) below (II)

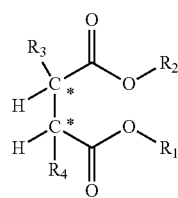

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, $C_3$-$C_{20}$ cycloalkyl, $C_5$-$C_{20}$ aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S).

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, particularly preferred are the compounds of formula (III)

(III)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; RIV groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the RIII radicals are preferably hydrogen. Moreover, when RI is methyl, ethyl, propyl, or isopropyl, RII can be ethyl, propyl, isopropyl, butyl, isobutyl, tert-butyl, isopentyl, 2-ethylhexyl, cyclopentyl, cyclohexyl, methylcyclohexyl, phenyl or benzyl; when RI is hydrogen, RII can be ethyl, butyl, sec-butyl, tert-butyl, 2-ethylhexyl, cyclohexylethyl, diphenylmethyl, p-chlorophenyl, 1-naphthyl, 1-decahydronaphthyl; RI and RII can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2 (1-naphthyl)-1,3-dimethoxypropane, 2 (p-fluorophenyl)-1,3-dimethoxypropane, 2 (1-decahydronaphthyl)-1,3-dimethoxypropane, 2 (p-tert-butylphenyl)-1,3-dimethoxypropane, 2,2-dicyclohexyl-1,3-dimethoxypropane, 2,2-diethyll-1,3-dimethoxypropane, 2,2-dipropyl-1,3-dimethoxypropane, 2,2-di-n-butyl-1,3-dimethoxypropane, 2,2-diethyll-1,3-diethoxypropane, 2,2-dicyclopentyl-1,3-dimethoxypropane, 2,2-dipropyl-1,3-diethoxypropane, 2,2-di-n-butyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3- dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (IV)

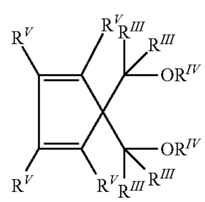

(IV)

where the radicals $R^{IV}$ have the same meaning explained above and the radicals $R^{III}$ and $R^{V}$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_2$-$C_{20}$ arylalkyl radicals and two or more of the $R^{V}$ radicals can be bonded to each other to form condensed cyclic structures, saturated or unsaturated, optionally substituted with RVI radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals; said radicals $R^{V}$ and $R^{VI}$ optionally containing one or more heteroatoms as substitutes for carbon or hydrogen atoms, or both.

Preferably, in the 1,3-diethers of formulae (III) and (IV) all the $R^{III}$ radicals are hydrogen, and all the $R^{IV}$ radicals are methyl. Moreover, are particularly preferred the 1,3-diethers of formula (II) in which two or more of the $R^{V}$ radicals are bonded to each other to form one or more condensed cyclic structures, preferably benzenic, optionally substituted by $R^{VI}$ radicals. Especially preferred are the compounds of formula (V):

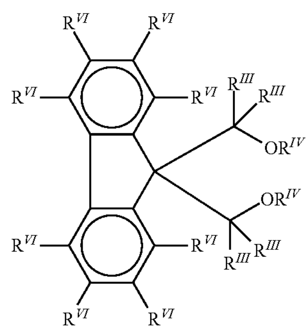

(V)

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (V).

Specific examples of compounds comprised in formulae (IV) and (V) are:

1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyilsilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the catalyst component of the invention comprises, in addition to the above electron donors, a titanium compound having at least a Ti-halogen bond and a Mg halide. The magnesium halide is preferably $MgCl_2$ in active form which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n−1 X is halogen and R is a hydrocarbon radical having from 1 to 10 carbon atoms.

Preferably, the said catalyst component has an average particle size ranging from 20 to 150 μm and more preferably from 40 to 100 μm.

The preparation of the solid catalyst component can be carried out according to several methods. According to the preferred method the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2pROH$, where p is a number between 0.1 and 2, and R is a hydrocarbon radical having 1-18 carbon atoms, said reaction being carried out in the presence of the two electron donors that can be added simultaneously or in sequence. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Example of spherical adducts prepared according to this procedure are described in U.S. Pat. Nos. 4,399,054 and 4,469,648. The so obtained adduct is then subject to thermal controlled dealcoholation (80-130° C.) so as to obtain an adduct in which the number of moles of alcohol is generally lower than 2, preferably between 0.1 and 1.5.

In the preferred method of producing the catalyst of the invention, the reaction with the Ti compound can be carried out by suspending the adduct (dealcoholated or as such) in cold $TiCl_4$ generally at 0° C. Preferably the adduct is used in an amount such as to have a concentration ranging from 20 to 100 g/l, and preferably from 30 to 90 g/l. The temperature is then gradually raised up until reaching a temperature ranging from 90-130° C. and kept at this temperature for 0.5-3 hours. According to a preferred embodiment, the succinate is added in this first stage of reaction and preferably when the temperature of the mixture is in the range of 0°-40° C. The molar ratio with which it is used depends on the desired final amount of ester in the catalyst but generally the Mg/succinate molar ratio may range from 3 to 25 and preferably from 5 to 20. After completing the reaction time stirring is stopped, the slurry is let to settle and liquid phase removed. A second stage of treatment with TiCl4 is performed, preferably carried out at a temperature ranging from 70 to 110° C. It has been found preferable adding the 1,3-diether at this stage of the procedure and more preferably when the temperature of the mixture is still in the range 40-80° C. Also in this case the amount of donor is to be selected according to the desired final amount on the catalyst but generally the Mg/diether molar ratio may range from 1 to 15 and preferably from 3 to 10.

After completing the reaction time, stirring is stopped, the slurry is let to settle and liquid phase removed. Preferably, the solid catalyst component obtained after this step is contacted an additional time with the titanium compound and preferably with TiCl4 under the same conditions described for the previous step with the difference that no donor is used. The so obtained solid can then be washed with liquid hydrocarbon under mild conditions and then dried.

The solid catalyst components according to the present invention are converted into catalysts for the polymerization of olefins by reacting them with organoaluminum compounds according to known methods.

In particular, it is an object of the present invention a catalyst for the polymerization of olefins $CH_2{=}CHR$, in which R is hydrogen or a hydrocarbyl radical with 1-12 carbon atoms, comprising the product obtained by contacting:

(i) the solid catalyst component as disclosed above and
(ii) an alkylaluminum compound and, optionally,
(iii) an external electron donor compound.

The alkyl-Al compound (II) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as $AlEt_2Cl$ and $Al_2Et_3Cl_3$, possibly in mixture with the above cited trialkylaluminum compounds.

Suitable external electron-donor compounds (iii) include silicon compounds, ethers, esters, amines, heterocyclic compounds and particularly 2,2,6,6-tetramethylpiperidine and ketones.

Another class of preferred external donor compounds is that of silicon compounds of formula $(R_7)a(R_8)bSi(OR_9)c$, where a and b are integers from 0 to 2, c is an integer from 1 to 4 and the sum (a+b+c) is 4; $R_7$, $R_8$, and $R_9$, are alkyl, cycloalkyl or aryl radicals with 1-18 carbon atoms optionally containing heteroatoms. Particularly preferred are the silicon compounds in which a is 1, bis 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group, in particular methyl. Examples of such preferred silicon compounds are methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane. Moreover, are also preferred the silicon compounds in which a is 0, c is 3, $R_8$ is a branched alkyl or cycloalkyl group, optionally containing heteroatoms, and $R_9$ is methyl. Examples of such preferred silicon compounds are cyclohexyltrimethoxysilane, t-butyltrimethoxysilane and thexyltrimethoxysilane.

The external electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins $CH_2{=}CHR$, in which R is hydrogen or a hydrocarbyl radical with 1-12 carbon atoms, carried out in the presence of a catalyst comprising the product of the reaction between:

(i) the solid catalyst component of the invention;
(ii) an alkylaluminum compound and,
(iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The catalyst of the present invention can be used as such in the polymerization process by introducing it directly into the reactor. In the alternative, the catalyst can be pre-polymerized before being introduced into the first polymerization reactor. The term pre-polymerized as used in the art, means a catalyst which has been subject to a polymerization step at a low conversion degree. According to the present invention a catalyst is considered to be pre-polymerized when the amount the polymer produced is from about 0.1 up to about 1000 g per gram of solid catalyst component.

The pre-polymerization can be carried out with the α-olefins selected from the same group of olefins disclosed before. In particular, it is especially preferred pre-polymerizing ethylene or mixtures thereof with one or more α-olefins in an amount up to 20% by mole. Preferably, the conversion of the pre-polymerized catalyst component is from about 0.2 g up to about 500 g per gram of solid catalyst component.

The pre-polymerization step can be carried out at temperatures from 0° to 80° C. preferably from 5° to 50° C. in liquid or gas-phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa, preferably between 1.5 and 5 MPa.

The preferred alpha-olefins to be (co)polymerized are ethylene, propylene, butene-1,4-methyl-1-pentene and hexene-1. In particular, the above described catalysts have been used in the (co)polymerization of propylene and ethylene to prepare different kinds of products. For example the following products can be prepared: high density ethylene polymers (HDPE, having a density higher than 0.940 g/cm$^3$), comprising ethylene homopolymers and copolymers of ethylene with alpha-olefins having 3-12 carbon atoms; linear low density polyethylenes (LLDPE, having a density lower than 0.940 g/cm$^3$) and very low density and ultra low density (VLDPE and ULDPE, having a density lower than 0.920 g/cm$^3$, to 0.880 g/cm$^3$ consisting of copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%.

As mentioned above, these catalysts are particularly suitable for producing high impact resistance polymer compositions comprising a crystalline propylene homo or copolymer matrix and a substantial amount, in certain applications more than 50% wt, of a very low crystalline, highly soluble in xylene ethylene based copolymer.

Such polymer compositions are preferably prepared in a multistep process comprising at least two different polymerization stages carried out in different reactors. Usually the first step, in which the crystalline propylene homo or copolymer is prepared, can be carried out either in gas-phase or in liquid phase. The gas-phase polymerization can be carried out in a fluidized or stirred, fixed bed reactor or in a gas-phase reactor comprising two interconnected polymerization zones one of which, working under fast fluidization conditions and the other in which the polymer flows under the action of gravity. The liquid phase process can be either in slurry, solution or bulk (liquid monomer). This latter technology is the most preferred and can be carried out in various types of reactors such as continuous stirred tank reactors, loop reactors or plug-flow ones. Preferably, the first step is carried out in gas-phase. In this stage and/or in the successive stage, hydrogen can be used as a molecular weight regulator. The propylene polymer obtained in this stage has a xylene insolubility preferably higher than 90% and more preferably higher than 95%, an isotactic index in terms of content of isotactic pentads (determined with C13-NMR on the whole polymer) higher than 93%.

In the second stage of the polymerization process, the ethylene copolymer (B) is produced preferably in a conventional fluidized-bed gas-phase reactor in the presence of the polymeric material and the catalyst system coming from the preceding polymerization step.

The polymer produced in this stage is an ethylene copolymer containing from 15 to 75% wt of a C3-C10 alpha olefin, optionally containing minor proportions of a diene, being for at least 60% soluble in xylene at room temperature. Preferably, the alpha olefin is selected from propylene or butene-1 and its content preferably ranges from 20 to 70% wt.

The following examples are given to illustrate and not to limit the invention itself.

Characterization

Determination of Porosity.

Porosity and surface area with mercury: the measurement is carried out using a Pascal 140-240 series porosimeter by Carlo Erba.

The porosity is determined by intrusion of mercury under pressure. For this determination a calibrated dilatometer (capillary diameter 3 mm) $CD_3P$ (by Carlo Erba) is used, that is connected to a reservoir of mercury and to a high-vacuum pump. A weighed amount of sample is placed in the dilatometer. The apparatus is then placed under high vacuum and is maintained in these conditions for ca. 20 minutes. The dilatometer is then connected to the mercury reservoir and the mercury is allowed to slowly fill the dilatometer, until it reaches the level marked on the dilatometer at a height of 10 cm. The valve that connects the dilatometer to the vacuum pump is closed and then the mercury pressure is gradually increased with nitrogen up to 100 kPa. Subsequently, the calibrated dilatometer is transferred into an autoclave with oil for high pressure in order to reach pressure values up to 200 MPa. Under the effect of the pressure, the mercury enters into the pores of the particles and the mercury level decreases accordingly.

The porosity (cm$^3$/g), the pore distribution curve and the average pore size are directly calculated from the integral pore distribution curve, which is a function of both the volume reduction of the mercury and the applied pressure values. All these data are provided and elaborated by the porosimeter associated computer which is equipped with dedicated software supplied by Carlo Erba. After calculation, the average pores radius is given as weighted average of the single average pores radius contribution for each interval of porosity.

Determination of X.I.

About 2.5 grams of polymer and 250 ml of o-xylene were placed in a round-bottomed flask provided with a cooler and a reflux condenser and kept under nitrogen. The obtained mixture was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I. %.

Determination of Polymer Soluble in Diethyl Ether

In a 1 L flask equipped with a condenser, 500 ml of diethyl-ether (DEE) and 25 g of polymer were added. The flask was warmed up to 40° C. and after the diethyl-ether started to reflux on the condenser the extraction was continued for 4 hours.

After these 4 hours, the residual polymer was filtered off and dried to constant weight. The solvent was evaporated and the soluble fraction was recovered for analysis (GPC and NMR). The amount of polymer soluble in diethyl-ether (DEE-S) was determined as: DEE-S=100·(grams of soluble polymer)/(grams of initial polymer)

Determination of Donors.

The content of electron donor has been carried out via gas-chromatography.

Determination of Melt Flow Rate (MFR).

The melt flow rate MIL of the polymer was determined according to ISO 1133 (230° C., 2.16 Kg).

EXAMPLES

General Procedure for the Preparation of $MgCl_2.(EtOH)_m$ Adducts.

An initial amount of microspheroidal $MgCl_2.2.8C_2H_5OH$ was prepared according to the method described in Example 2 of U.S. Pat. No. 4,399,054 but operating at 3,000 rpm instead of 10,000. The so obtained adduct having an average particle size of 87 μm was then subject to thermal dealcoholation at increasing temperatures from 30 to 130° C. operating in nitrogen current until the molar alcohol content per mol of Mg is 1.16.

Preparation of Solid Catalyst Component—General Procedure.

Into a 1000 mL four-necked round flask, purged with nitrogen, 500 mL of $TiCl_4$ were introduced at 0° C. While stirring, 30 grams of the microspheroidal $MgCl_2.1.16C_2H_5OH$ adduct (prepared as described above) were added. The temperature was raised to 120° C. and kept at this value for 60 minutes. During the temperature increase, an amount of diethyl 2,3-diisopropylsuccinate was added such as to have a Mg/succinate molar ratio reported in Table 1. Donor addition was done at the temperature indicated in Table 1. After the mentioned 60 minutes, the stirring was stopped, the liquid siphoned off and the treatment with $TiCl_4$ was repeated at 100° C. for 1 hour in the presence of an amount of 9,9-bis(methoxymethyl)fluorene such as to have a Mg/donor molar ratio reported in Table 1. After that time the stirring was stopped, the liquid siphoned off and the treatment with $TiCl_4$ was repeated at 100° C. for 30 min. After sedimentation and siphoning at 85° C. the solid was washed six times with anhydrous hexane (6×100 ml) at 60° C. The characterization of the so obtained solid catalytic component is reported in Table 1.

General Procedure for the Homo-Polymerization of Propylene in Bulk

A 4-litre steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, were charged in sequence: 75 ml of anhydrous hexane, 0.76 g of $AlEt_3$, external electron donor (either dicyclopentyldimethoxysilane (D donor) or diisopropyldimethoxysilane (P-donor)) at a Al/donor=4 molar ratio, and about 10 mg of solid catalyst component. The autoclave was closed and subsequently the indicated amount of hydrogen was added. Then, under stirring, 1.2 kg of liquid propylene were fed. The temperature was raised to 70° C. in five minutes and the polymerization was carried out at this temperature for two hours. At the end of the polymerization, the non-reacted propylene was removed; the polymer was recovered and dried in an oven at 80° C.

General Procedure for the Random Copolymerization of Ethylene and Propylene

About 30-40 mg of the solid catalyst precursor were reacted with 0.76 g of TEA and 380 mg of dicyclopentyl dimethoxy silane (Al/ED=4 mol/mol) in about 10 mL of iso-hexane. The activated catalyst was transferred into a 4.5 L stainless steel autoclave at room temperature and, after closing the reactor, 700 g of propane, 38 g of propylene and the desired amount of $H_2$ (tuned to reach MIL=25 g/10, see Table 5) were added. The autoclave was warmed up to 68° C. in about 10 minutes and 500 mL of propylene were quickly added to the reactor along with 5 g of ethylene. The polymerization was carried out at 70° C. for 1 hour and propylene and ethylene were continuously added during this time with a constant feed of 240 g/h and with a feeding composition equal to $C_2/C_2+C_3$=0.03 wt/wt. At the end the monomers and propane were vented off. After the complete venting of monomers, the polymer was recovered and dried under vacuum in an oven at 80° C.

General Procedure for the Preparation of a Heterophasic Copolymer of Propylene and Ethylene About 30-40 mg of the solid catalyst precursor were reacted with 0.76 g of TEA and 380 mg of dicyclopentyldimethoxy silane (Al/ED=4 mol/mol) in about 10 mL of iso-hexane. The activated catalyst was transferred into a 4.5 L stainless steel autoclave at room temperature and, after closing the reactor, 700 g of propane, 38 g of propylene and the desired amount of $H_2$ (tuned to reach MIL=25 g/10, see Table 6) were added. The autoclave was warmed up to 70° C. in about 10 minutes and 500 mL of propylene were quickly added to the reactor. The polymerization was carried out at 70° C. for 1 hour. At the end of this time the monomer and propane were vented off and the temperature decreased, without control, to about 35-40° C. After the complete venting of liquid phase, the procedure for the gas phase reaction was started: desired amount of hydrogen was added and, at the same time as the autoclave was warmed to 60° C., 16 g of ethylene and 124 g of propylene were fed. The conditions were chosen in order to reach simultaneously the internal autoclave temperature of 60° C. and the end of monomer feeding. This moment was defined as the starting time of gas phase copolymerization. The transition step time was about 11 minutes. The copolymerization was conducted by feeding ethylene and propylene mixture in a 30/70 wt/wt ratio to keep the pressure constant and equal to 18 barg. The polymerization was stopped when an estimated 30% wt of split of copopolymer was reached. This split value was approximated from the amount of monomers fed during the gas phase polymerization and from the amount of homopolymer made in the liquid phase polymerization. The latter was determined in independent homopolymer runs.

At the end the monomers were vented off. After the complete venting of monomers, the polymer was recovered and dried under vacuum in an oven at 80° C.

Ethylene General Polymerization Procedure

Into a 4 liters stainless steel autoclave degassed under $N_2$ stream at 70° C. for one hour, 0.02 g of catalyst component, 13.7 mg of cyclohexylmethyldimethoxysilane and 0.5 g of AlEt3 at room temperature were introduced.

The autoclave was closed and then 250 ml of propane and 20 g of propylene were added keeping temperature at 30° C. The polymerisation step was stopped after 45 minutes, totally discharging propane and propylene. After the introduction of 1.6 liters of propane, the temperature was raised to 75° C. and 3 bar of $H_2$ and 7 bar of ethylene were fed into the reactor. During the polymerization ethylene was fed to keep the pressure constant. After 3 hours the polymerization was discontinued and the spherical polymer was collected and dried at 70° C. under a nitrogen flow.

Inventive Solid Catalyst Component Examples

Eight solid catalyst components (according to the present invention) were prepared with the general procedure described above, according to the conditions indicated in Table 1. In Example 2, short settling times were used in the various titanation steps. In Example 8, part of the diether donor was charged in the first titanation, at Mg/ID=7.5 molar. The second part was charged in the second titanation, at Mg/ID=15 molar. The whole amount of succinate was charged in the first titanation.

TABLE 1

Solid catalyst component examples (inventive)

| | 1st titanation | | | Catalyst characterization | | | |
|---|---|---|---|---|---|---|---|
| Ex | Mg/succ mole ratio | T_donor ° C. | 2nd titanation Mg/diether molar | Ti wt % | ID/Ti molar | diether/succinate molar | porosity $cm^3/g$ |
| 1 | 15 | 70 | 5 | 3.0 | 0.50 | 1.39 | 0.439 |
| 2 | 15 | 70 | 5 | 3.2 | 0.59 | 1.71 | 0.402 |
| 3 | 15 | 40 | 5 | 2.9 | 0.70 | 1.21 | 0.442 |
| 4 | 11 | 0 | 7 | 3.0 | 0.69 | 0.79 | 0.498 |
| 5 | 11 | 40 | 7 | 3.2 | 0.59 | 1.06 | 0.480 |
| 6 | 11 | 70 | 7 | 2.8 | 0.63 | 1.09 | n.d. |
| 7 | 7.5 | 0 | 7.5 | 2.8 | 0.57 | 0.72 | n.d. |
| 8 | 15 | 40 | 7.5 + 15 | 3.2 | 0.45 | 1.49 | n.d. |

n.d. = not determined

Comparative Solid Catalyst Component Examples

Three solid catalyst components (comparative examples) were prepared with the general procedure described above, according to the conditions indicated in Table 2. In all cases, the internal donor was charged only in first titanation stage, in the amount indicated in Table 2, at the temperature indicated in the Table 2. The three titanation steps were done at the temperature and durations as indicated in the same table.

The internal donors used in Examples C1, C2 and C3 were respectively diisobutyl phthalate, diethyl 2,3-diisopropylsuccinate and 9,9-bis(methoxymethyl)fluorene. The compositions and the measured porosity of the resulting solids are given in Table 2.

TABLE 2

Solid catalyst component examples (comparative)

| | | Preparation conditions | | | Characterization | | |
|---|---|---|---|---|---|---|---|
| Ex | Donor | Mg/ ID | T_ID ° C. | T/t titanations ° C./hrs | Ti wt % | ID/ Ti molar | porosity $cm^3/g$ |
| C1 | DIBP | 8 | 0 | 100/2-120/1-120/0.5 | 2.3 | 0.43 | 0.709 |
| C2 | succ | 7.5 | 40 | 120/2-100/1-100/0.5 | 2.9 | 0.53 | n.d. |
| C3 | diether | 6 | 0 | 100/2-110/1-110/1 | 6.0 | 0.08 | n.d. |

n.d. = not determined

Bulk Polymerization of Propylene

The above listed solid catalyst components were used for the homo-polymerization of propylene in bulk phase, using the general method described above. The results of the polymerization runs are given in Table 3 below.

TABLE 3

Results of homo-polymerization in bulk propylene

| Ex | Solid component | Ext donor | $H_2$ NL | Mileage kg/g | XI % wt | MIL g/10' | BDP kg/L |
|---|---|---|---|---|---|---|---|
| 9 | 1 | D | 2 | 24 | 97.5 | 7.5 | 0.36 |
| 10 | 2 | D | 2 | 20 | 97.8 | 7.2 | 0.37 |
| 11 | 3 | D | 2 | 21 | 97.9 | 6.3 | 0.34 |
| 12 | 4 | D | 2 | 25 | 98.2 | 3.4 | 0.34 |
| 13 | 5 | D | 2 | 26 | 98.0 | 2.9 | 0.33 |
| 14 | 6 | D | 2 | 28 | 98.1 | 5.5 | 0.36 |
| 15 | 7 | D | 2 | 31 | 98.2 | 3.2 | 0.35 |
| 16 | 4 | D | 5 | 27 | 98.1 | 37 | 0.37 |
| 17 | 4 | D | 8 | 24 | 97.6 | 66 | 0.36 |
| 18 | 4 | D | 10 | 21 | 98.4 | 107 | 0.36 |
| 19 | 4 | P | 2 | 26 | 98.0 | 9 | 0.34 |
| 20 | 4 | P | 5 | 27 | 97.8 | 43 | 0.36 |
| 21 | 4 | P | 10 | 24 | 98.1 | 100 | 0.37 |
| C4 | C1 | D | 2 | 37 | 97.7 | 4.2 | 0.33 |
| C5 | C2 | D | 2 | 28 | 97.7 | 2.7 | 0.31 |
| C6 | C3 | D | 2 | 24 | 90.7 | 20 | 0.37 |

External donor:
D—dicyclopentyldimethoxysilane
P—diisopropyldimethoxysilane

Bulk Polymerization of Propylene with Subsequent Ether Extraction

A selection of the above listed solid catalyst components were used for the homo-polymerization of propylene in bulk phase, using the general method described above. The yielding polymers were characterized, including the determination of the solubility in ether, following the general procedure described above. The results of the polymerizations and characterizations are given in Table 4 below.

TABLE 4

| Synthesis and characterization of homo-polymer samples | | | | | | | | | |
|---|---|---|---|---|---|---|---|---|---|
| | | | | | | | Analysis of DEE-solubles | | |
| Ex | Solid Component | $H_2$ NL | Mileage kg/g | MIL g/10' | XI % wt | DEE-S % wt | Mw (GPC) g/mole | Mw/Mn (GPC) | mmmm ($^{13}$C NMR) % |
| C7 | C1 | 7 | 29 | 28.5 | 97.7 | 1.1 | 5540 | 5.3 | 36.4 |
| 22 | 8 | 4.2 | 24 | 26.5 | 97.1 | 1.9 | 9830 | 4.2 | 34.0 |
| 23 | 7 | 4.5 | 27 | 22.0 | 98.0 | 1.2 | 9340 | 4.5 | 33.0 |

Random Copolymerization of Ethylene and Propylene

A selection of the above mentioned solid catalyst components were used for the random copolymerization of ethylene and propylene, using the general method for random copolymerization described above. The catalysts used, and the characterization results obtained, are listed in Table 5.

TABLE 5

| Results of the random copolymerization of ethylene and propylene | | | | | | | |
|---|---|---|---|---|---|---|---|
| Ex | Solid Component | $H_2$ NL | Mileage kg/g | XI % wt | MIL g/10' | C2 ($^{13}$C NMR) % wt | $r_1r_2$ ($^{13}$C NMR) |
| C8 | C1 | 7.5 | 5.7 | 94.0 | 27 | 3.3 | 2.6 |
| 24 | 3 | 5.0 | 5.9 | 93.4 | 26 | 2.8 | 2.6 |
| 25 | 5 | 4.7 | 6.5 | 93.4 | 24 | 3.0 | 2.4 |

Heterophasic Copolymerization of Ethylene and Propylene

A selection of the above mentioned solid catalyst components were used for the preparation of a heterophasic copolymer of ethylene and propylene, using the general method for heterophasic copolymer described above. The catalysts used, and the characterization results obtained, are listed in Table 6 below.

TABLE 6

| Synthesis and characterization of HECO samples | | | | | | | | | | | | | |
|---|---|---|---|---|---|---|---|---|---|---|---|---|---|
| | First Step | | | | Second Step | | | | Characterization of the hetrophasic copolymer | | | | |
| | Liquid Phase | | | | Gas Phase | | | | | | C2 | Bipol | C2 in |
| Solid Comp | H2 NL | Mileage kg/g | MIL g/10' | XI % | $T_{GP}$ ° C. | H2 NL | tGP min | Mileage kg/g | MIL g/10' | XI % | (NMR) % wt | split % | bipol % wt |
| C1 | 4.0 | 3.5 | 23 | 98.1 | 60 | 1 | 70 | 11.8 | 1.1 | 40.8 | 21.1 | 27.0 | 28.9 |
| 3 | 2.3 | 3.2 | 22 | 98.0 | 60 | 0.75 | 63 | 12.5 | 1.1 | 41.0 | 19.7 | 25.4 | 26.4 |
| 5 | 2.6 | 3.5 | 22 | 98.0 | 60 | 0.9 | 70 | 12.0 | 1.1 | 41.1 | 20.6 | 29.0 | 29.0 |

Slurry Polymerization of Ethylene

The solid catalyst components prepared according to examples 7 and 8 were used for the preparation of ethylene polymers using the general method described above. The catalysts used, and the characterization results obtained, are listed in Table 7 below.

TABLE 7

| | Polymerisation test | | | | | |
|---|---|---|---|---|---|---|
| Cat. Ex. | Mil. Kg/g | MIE g/10' | MIF g/10' | F/E | BDP g/cc | APS mic |
| 7 | 20.4 | 0.22 | 6.1 | 27.7 | 0.356 | 3328 |
| 8 | 20.5 | 0.19 | 5.1 | 26.8 | 0.331 | 3171 |

What is claimed is:

1. A catalyst system comprising:

(A) a solid catalyst component comprising:

(i) a magnesium halide, (ii) $TiCl_4$, (iii) a first internal electron donor, and (iii) a second internal electron donor, wherein the first internal electron donor compound is a 1,3-diether, and wherein the second internal electron donor is a succinate;

wherein the first internal electron donor and the second internal electron donor have an internal electron donor molar ratio from 0.80-1.80, and the ratio of the total amount of the first and second internal electron donors to Ti is from 0.45-0.75; and wherein the solid catalyst component has a porosity of greater than 0.40 $cm^3/g$, based upon pores with a radius equal to or less than 1 μm present in the solid catalyst component;

(B) an alkylaluminum cocatalyst compound; and (C) an external electron donor compound selected from silicon compounds of formula $R_a^5R_b^6Si(OR^7)_c$, where a and b are integers from 0 to 2, c is an integer from 1 to 4 and the sum (a+b+c) is 4; $R^5$, $R^6$ and $R^7$ are alkyl, cycloalkyl or aryl radicals with 1-18 carbon atoms optionally containing heteroatoms.

2. The catalyst system according to claim 1, wherein the succinate is selected from formula (I):

(I)

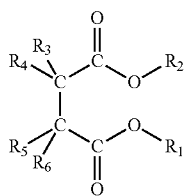

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom of the succinate chain can be linked together to form a cycle.

3. The catalyst system according to claim 1, wherein the 1,3-diether has a formula (III):

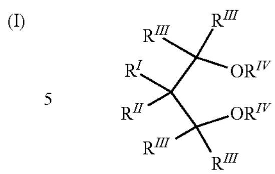

wherein $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

4. The catalyst system according to claim 1, wherein the solid catalyst component is supported on a Mg halide in active form.

* * * * *

UNITED STATES PATENT AND TRADEMARK OFFICE

CERTIFICATE OF CORRECTION

PATENT NO. : 9,593,171 B2
APPLICATION NO. : 14/111144
DATED : March 14, 2017
INVENTOR(S) : Simona Guidotti et al.

It is certified that error appears in the above-identified patent and that said Letters Patent is hereby corrected as shown below:

In the Specification

| | | |
|---|---|---|
| Column 6 | Line 21 | Delete "RIV" and insert --$R^{IV}$-- |
| Column 6 | Line 26 | Delete "RIII" and insert --$R^{III}$-- |
| Column 6 | Line 27 | Delete "RI" and insert --$R^{I}$-- |
| Column 6 | Line 28 | Delete "RII" and insert --$R^{II}$-- |
| Column 6 | Line 31 | Delete "RI" and insert --$R^{I}$-- |
| Column 6 | Line 31 | Delete "RII" and insert --$R^{II}$-- |
| Column 6 | Line 33 | Delete "RI and RII" and insert --$R^{I}$ and $R^{II}$-- |
| Column 7 | Line 31 | Delete "$C_2$-$C_{20}$" and insert --$C_7$-$C_{20}$-- |
| Column 7 | Line 34 | Delete "RVI" and insert --$R^{VI}$-- |
| Column 9 | Line 49 | Delete "TiCl4" and insert --$TiCl_4$-- |
| Column 9 | Line 62 | Delete "TiCl4" and insert --$TiCl_4$-- |
| Column 10 | Line 29 | Delete "bis" and insert --b is-- |
| Column 12 | Line 15 | Delete "C13-NMR" and insert --$^{13}C$-NMR-- |
| Column 12 | Line 22 | Delete "C3-C10" and insert --$C_3$-$C_{10}$-- |
| Column 15 | Line 4 | Delete "AlEt3" and insert --$AlEt_3$-- |
| Column 17 | Line 5 | In Table 6, delete "H2" and insert --$H_2$-- |
| Column 17 | Line 5 | In Table 6, delete "H2" and insert --$H_2$-- |

Signed and Sealed this
Eighth Day of October, 2019

Andrei Iancu
*Director of the United States Patent and Trademark Office*